J. H. TOMPKINS AND C. J. FOSTER.
FRUIT HANDLING MACHINE.
APPLICATION FILED JUNE 4, 1920. RENEWED APR. 8, 1921.

1,379,600.

Patented May 24, 1921.
6 SHEETS—SHEET 1.

INVENTORS
JAMES H. TOMPKINS
CARROLL J. FOSTER
BY
Frank Keefer
ATTORNEY

Fig-2

J. H. TOMPKINS AND C. J. FOSTER.
FRUIT HANDLING MACHINE.
APPLICATION FILED JUNE 4, 1920. RENEWED APR. 8, 1921.

1,379,600.

Patented May 24, 1921.
6 SHEETS—SHEET 3.

INVENTORS
JAMES H. TOMPKINS
CARROLL J. FOSTER
BY
Frank Kiefer
ATTORNEY

J. H. TOMPKINS AND C. J. FOSTER.
FRUIT HANDLING MACHINE.
APPLICATION FILED JUNE 4, 1920. RENEWED APR. 8, 1921.

1,379,600.

Patented May 24, 1921.
6 SHEETS—SHEET 4.

INVENTORS
JAMES H. TOMPKINS
CARROLL J. FOSTER
BY
Frank Keifer
ATTORNEY

J. H. TOMPKINS AND C. J. FOSTER.
FRUIT HANDLING MACHINE.
APPLICATION FILED JUNE 4, 1920. RENEWED APR. 8, 1921.

1,379,600.

Patented May 24, 1921.

INVENTORS
JAMES H. TOMPKINS
CARROLL J. FOSTER
BY
Frank Keifer
ATTORNEY

UNITED STATES PATENT OFFICE.

JAMES HENRY TOMPKINS AND CARROLL J. FOSTER, OF WEBSTER, NEW YORK.

FRUIT-HANDLING MACHINE.

1,379,600.  Specification of Letters Patent.  Patented May 24, 1921.

Application filed June 4, 1920, Serial No. 386,574. Renewed April 8, 1921. Serial No. 459,742.

*To all whom it may concern:*

Be it known that we, JAMES HENRY TOMPKINS and CARROLL J. FOSTER, citizens of the United States, residing at Webster, in the county of Monroe and State of New York, have invented certain new and useful Improvements in Fruit-Handling Machines, of which the following is a specification.

The object of this invention is to provide a new and improved form of fruit handling machine, by means of which apples are fed from a hopper and fed in the proper position toward the apple paring machine, where they are picked up and placed automatically on the forks of the paring machine.

This and other objects of the invention will be fully illustrated in the drawings, described in the specifications, and pointed out in the claims at the end thereof.

In the acompanying drawings:

Fig. 5 is a side elevation of the pick-up mechanism shown in front elevation in Fig. 3, the arm of the pick-up mechanism being shown in position ready to pick up an apple which has been previously located by the locating mechanism.

Fig. 6 is side elevation of the pick-up mechanism showing the arm thereof in position after the apple has been placed on the paring machine.

In the several figures of the drawings like reference numerals indicate like parts.

The fruit handling machine forming the subject matter of this invention is operated in connection with a paring machine, to which the fruit handling machine automatically feeds the apples. The fruit handling machine contains a power shaft 4 shown in Fig. 1 on which is keyed a bevel gear 3. The bevel gear 3 meshes with the bevel gear 2 carried on a jack shaft 1 which is mounted at right angles to the power shaft 4.

On one side of the power shaft 4 is mounted the pulley 5 which is driven from a belt (not shown) from the line shaft. On the other end of shaft 4 is carried the sprocket wheel 6 which drives the sprocket wheel 7 through the sprocket chain 8. The sprocket wheel 7 is keyed to the jack shaft 9, which has a second sprocket wheel 10 provided thereon. On the rotation of the shaft 9, through the train of gearing heretofore described the sprocket wheel 10 rotates the sprocket wheel 11 by means of the sprocket chain 12. The sprocket wheel 11 is mounted on the shaft 13, which shaft rotates between the bearings 14 and 15, mounted on the table of the locating mechanism. On the outer end of the shaft 13 is carried the sprocket wheel 16 which is adapted to drive the conveyer chain 17. This chain passes over the large idler pulley 18 which is mounted to rotate on the shaft 19.

The conveyer chain 17 carries a series of conveyer brackets 20—20 which are adapted to lift the apple out of the hopper 21. The hopper 21 has all of its sides inclined toward an opening 22 which is located in the bottom thereof and through which the conveyer brackets 20 pass during their rotation over the sprocket wheel 16 and idler pulley 18. Projecting into the opening 22 in the bottom of the hopper 21 are the pins 23 and 24 which partially close this opening and prevent the apples placed in the hopper 21 from falling out therefrom. In order to make the conveyer brackets 20—20 move past the pins 23 and 24 each of the brackets is provided with a horizontal slot 25 and a vertical slot 26; the pin 24 is adapted to pass through the slot 26 of the conveyer brackets and the pin 23 is adapted to pass through the slot 25 of the conveyer brackets.

The hopper 21 is constructed so as to hold about a bushel of apples and from these apples the conveyer brackets pick up the apples one by one and carry them slightly above the level of the table 27. At this point the apples carried up by each of the conveyer brackets from the bottom of the hopper is brushed off by means of a finger 28 which is carried on the stationary bracket 29. The finger 28 is held parallel to the conveyer chain which carries the brackets 20 but projects toward it and into the slot 25 of the brackets 20. When an apple is picked up by the bracket 20 it rests against the curved back thereof into which the slot 25 is cut, and when the apple is carried to the position where the finger 28 begins to project into the slot 25 the apple is gradually forced out and away from the bracket 20 and dropped into the runway 30 mounted on the table 27.

The runway is made up from a circular flange 31 on the inside of which are formed the rails 32 and 33 with the slot 34 between them. The slot 34 is divided into two sections by means of the partition 35, which is mounted in the middle of the slot 34 and runs the full length thereof.

Mounted to rotate concentric with the circular flange 31 and the rails 32 and 33 formed on each side of the flange, is the horizontal conveyer wheel 36. This wheel is mounted to rotate on a suitable stud in the center of the table 27 and is made up of a circular gear wheel 37 which is driven from the gear 37$^A$ carried on the shaft 13. Besides the gear wheel 37 the conveyer wheel carries a series of conveyer cups 38 which are suitably pivoted thereto at proper intervals on the periphery thereof. Each of the conveyer cups 38 comprises the cup 39 from which the brackets 40 and 41 extend to one side thereof. The two brackets 40 and 41 form a fork into which the conveyer wheel projects, so that a pin 42 carried on to the conveyer wheel forms a stud on the top and bottom of the conveyer wheel on which the brackets 40 and 41 are mounted to swing. The bracket 41 of each of the conveyer cups 38 is provided with a rearward extension on the outer end of which is carried the anti-friction roller 43. The anti-friction roller 43 of each of the conveyer cups is successively held in contact with the cams 44, 45 and 46 during their rotation over the tracks 32 and 33. For this purpose a short extension of the bracket 40 of each of the conveyer cups 38 carries a pin 47 between which and a suitable pin 48 carried on the conveyer wheel is stretched an expansion spring 49. The action of these springs 49 on the conveyer cups 38 tend to hold these cups approximately radial to the conveyer wheel which position of the cups is changed at suitable intervals as the anti-friction roller 43 of the cups 38 rides over the cams 44, 45 and 46.

When the apple is brushed onto the runway it lands on its flat side, which may be either the stem end or the blow end of the apple. As soon as one of the conveyer cups reaches the position at which the apple has dropped into the runway the apple is pushed along the runway and in case the stem end of the apple is at the bottom of the runway the stem of the apple projects into the slot 34 formed between the rails 32 and 33.

It sometimes happens that during the movement along the runway the apple is pinched between the cup and the rails 32 and 33. This happens when the apple has been turned from its flat side, that is either the stem end or the blow end of the apple, and in such a case the apple must be given a chance to right itself before it is placed in the position for the pick-up mechanism.

In order to obtain this result the cams 44, 45 and 46 are broken away at 50 and 51 so that the anti-friction roller 42 drops back toward the center of the conveyer wheel as it moves from one of the cams to the other. In doing so the conveyer cup is forced back against the periphery of the conveyer wheel and into a suitable depression in the periphery thereof by means of the spring 49. As the conveyer cup moves into this position it leaves the apple free in the runway and gives it a chance to right itself on the flat end thereof. On the further rotation of the conveyer wheel the conveyer cup is gradually brought back to its normal regular position and is brought again in contact with the apple which, in the meantime, has righted itself to the proper position.

This operation happens twice during the movement of the apple along the runway until it has reached a position 51$^A$ at which point the cam holding the conveyer cups in the runway is cut away entirely so that the cup flies back against the conveyer wheel and leaves the apple properly located at this point. The conveyer cup then rests against the periphery of the conveyer wheel until it has again reached the point where it picks up the apple fed from the hopper 21, after which it moves through the same cycle of operation as above described.

After the apple has thus been located by the locating conveyer it is picked up by the pick-up mechanism which will now be described. This pick-up mechanism is mounted on a frame 52 which is provided at the front with a pair of uprights 53 and 54. Near the rear of the frame 52 are provided suitable bearings in which the shaft 55 is mounted to rock. Carried on this shaft and suitably fastened thereto are the arms 56 and 57 which carry on their outer ends suitable bearings for the shaft 58 to rock between them. Fastened to the shaft 58 by means of the clamp 59 is the hollow arm 60. This arm carries on its outer end the plate 61 on which a series of lugs 62 are provided between which the inwardly curved fingers 63 are mounted to swing. Each of these fingers 63 is provided at the upper end thereof with an angular extension 64 which projects toward the center of the hollow arm and to which the links 65 are attached. The links 65 are carried on the lower ends of the eye-bolts 66 on which they are mounted to swing. The eye-bolts 66 in turn are fastened to the sliding plate 67 by means of lock nuts which make threaded engagement with the threaded shanks of the eye-bolts. The sliding plate 67 in turn is connected to the plate 68 by means of the bolts 69 and 70. The plate 68 in turn is held yieldingly against the lower end of the sleeve 71 by means of the springs 72 and 73, which springs stretch between the pin 75 carried on the sleeve 71 and the plate 68. The pin 75 passes through a hole in the sleeve 71 and through a slot in the hollow arm 60. It moves with the sleeve 71 and moves a short distance relative to the arm 60. This movement causes the opening and closing of the fingers 63 as will presently appear.

Mounted to rock on the shaft 58 on one side of the hollow arm 60 is the lever 76 one side of which is connected with the pin 75 by means of the link 77. The other side of the lever 76 has the link 78 attached thereto, which link connects with the lever 79 pivoted at 80 to the arm 56. The free end of the lever 79 carries the anti-friction roller 81. This anti-friction roller together with the anti-friction roller 82 mounted on the link 78 are adapted to be operated upon by the fingers 83 and 84 carried on the shaft 85. The shaft 85 also carries the crank 86, which crank has a finger 87 projecting out at right angles thereto for a purpose that will presently appear. The crank 86 has a connecting rod 88 connected thereto which connecting rod connects the small lever 89 mounted on the frame of the mechanism with a crank 86. The shaft 85 has a coil spring 90 fastened thereto with one end thereof, which coil spring is attached to the frame at 91 and tends to rotate the shaft 85 in a clockwise direction, when viewing the pick-up mechanism as shown in Fig. 5.

Carried on the sprocket wheel 7 on the inner face thereof is an anti-friction roller 92, which anti-friction roller is adapted to come in contact with the finger 87 provided on the crank 86. On the rotation of the sprocket wheel 7 the engagement of the roller 92 with the finger 87 makes the shaft 85 turn against the tension of the spring 90 and in doing so the finger 83 is brought into contact with the anti-friction roller carried on the link 78. The rocking of the shaft due to this movement forces the link toward the left in Fig. 5, which in turn locks the lever 76 so that the link 77 is held in the upright position shown in Fig. 3.

Figure 1:
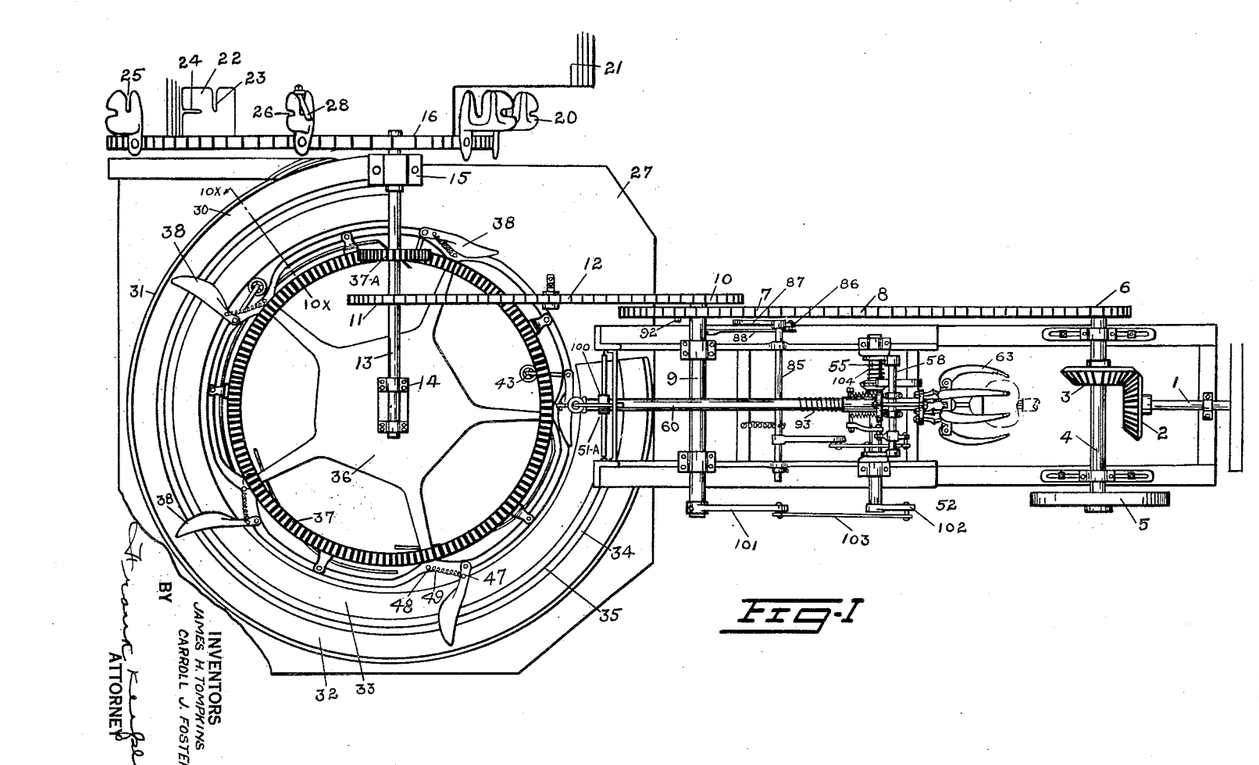
Figure 1 is a top plan view of the fruit handling machine.
Figure 2:
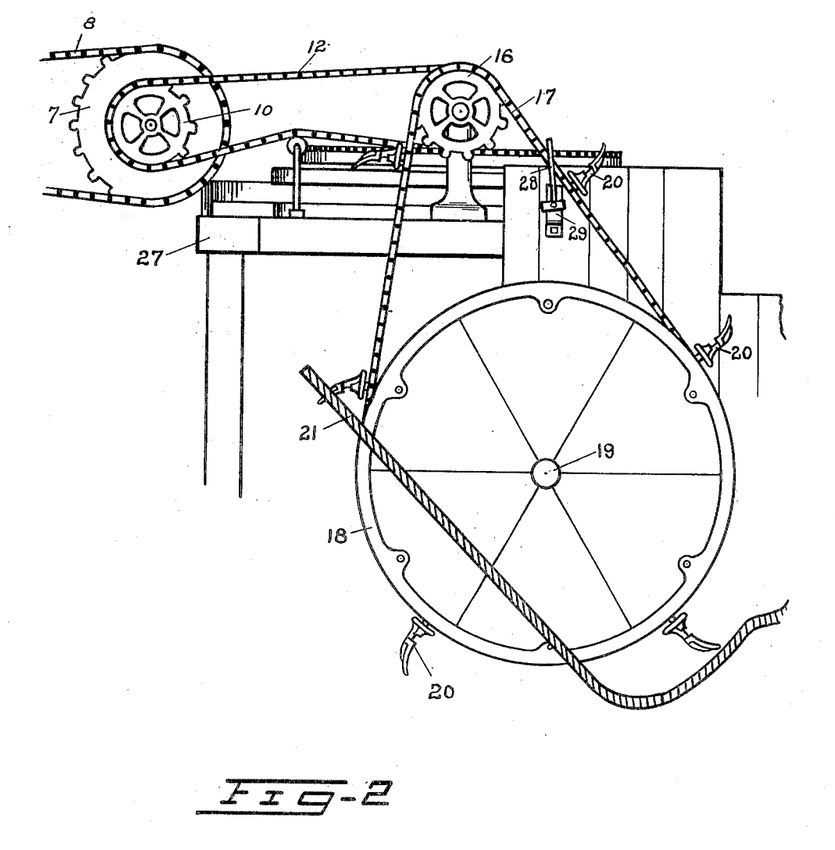
Fig. 2 is a side elevation of the conveyer mechanism, by means of which the apples are fed from the hopper to the locating mechanism, which places the apple in the proper position ready to be picked up and placed on the paring machine.

When in this position the plates 68 and 67 are pulled upward against the sleeve 71, which sleeve in turn is held yieldingly in position on the hollow arm 60 by the expansion spring 93. When the plates 68 and 67 are forced into this position the eye bolts 66 have raised the angular ends of the fingers 63 and in so doing have moved the fingers 63 toward the center axis of the arm and an apple which has previously been placed and left in the position indicated at 51ᴬ in Fig. 1 is thus gripped and held firmly in place between them.

In order to adjust the space between the fingers to receive a large as well as a small apple the movable backing plate 94 is provided. This plate is made in the form of a shallow cup and is carried on the lower end of the rod 95 mounted to slide on the inside of the hollow arm 60. The upper end of the rod 95 is connected to the ratchet 96, which ratchet projects out through the top of the arm 60. Mounted on the upper end of the arm 60 is the pawl lever 97. This pawl lever is provided with an arm 98 which normally hangs down from the upper end of the hollow arm 60 and holds the pawl in engagement with the ratchet teeth of the ratchet 96.

Figure 3:
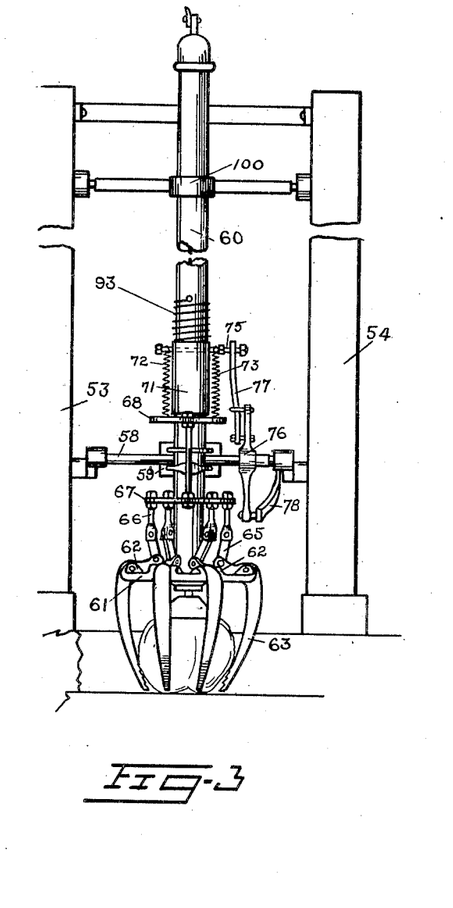
Fig. 3 is a front elevation of the pick up mechanism of the fruit handling machine.
Figure 4:
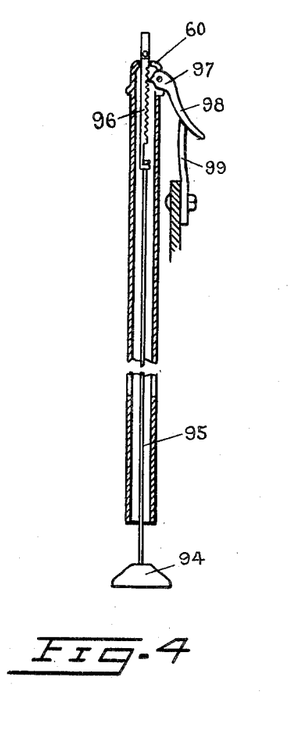
Fig. 4 is a vertical cross section through the arm of the pick-up mechanism, showing the mechanism for gaging the opening between the fingers for different sizes of apples.
Figure 7:
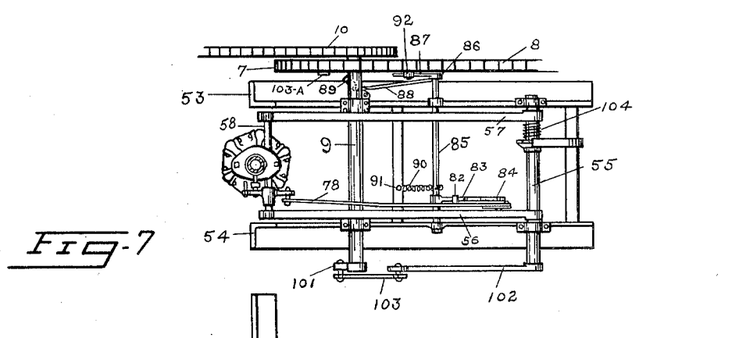
Fig. 7 is a top plan view of the pick-up mechanism.
Figure 8:
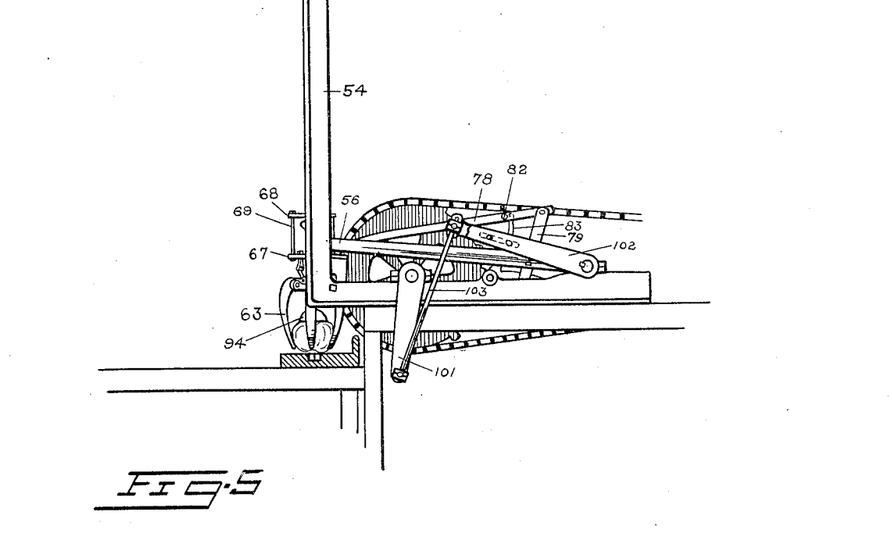
Fig. 8 is a top plan view of the table on which the locating mechanism is mounted.
Figures 9, 12:
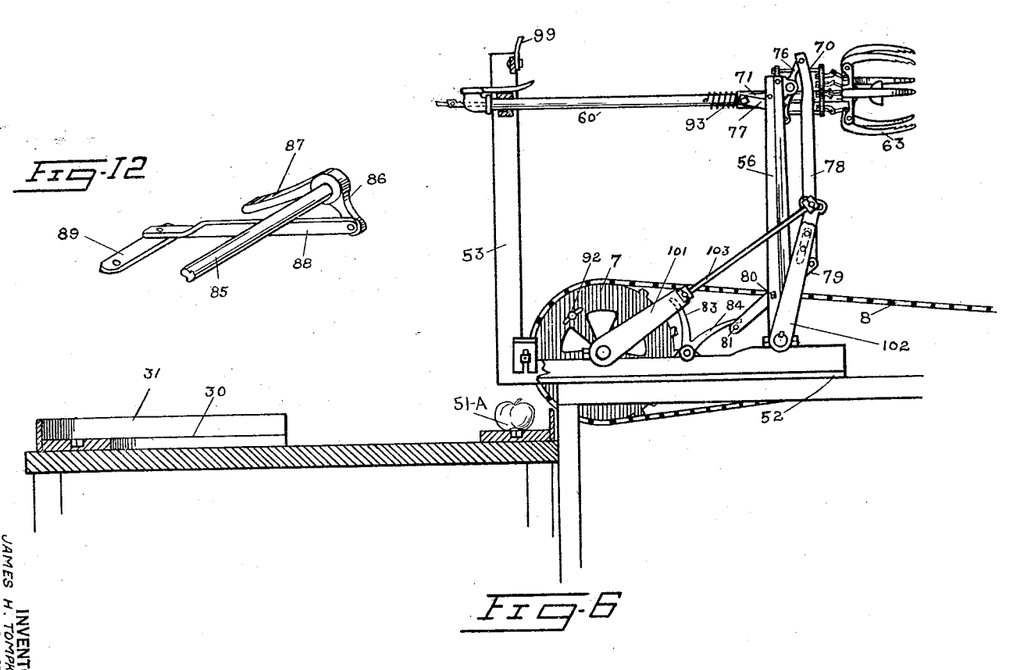
Fig. 9 is a detail perspective view of one of the cups used for locating the apple by the locating mechanism.
Fig. 12 is a perspective view of the shaft 85 and parts associated therewith.
Figure 9:
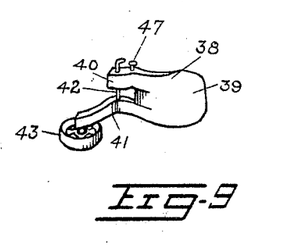
Figure 10:
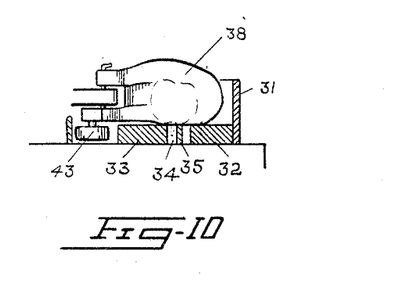
Fig. 10 is a cross section through the runway of the locating mechanism the section being taken on the line 10×—10× of Fig. 1.
Figure 11:
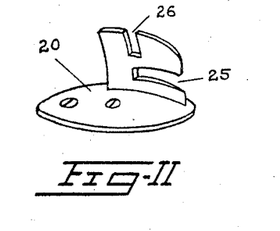
Fig. 11 is a perspective view of one of the conveyer brackets.

In the position of the hollow arm 60 shown in Figs. 3 and 4 the arm 98 is brought into contact with the lug 99 carried between the uprights 53 and 54. When making contact in this way the ratchet is disengaged from the ratchet teeth so that the rod 95 is free to drop in the hollow arm 60 and the cup 94 is allowed to rest on the top of the apple when the fingers 63 close in on it and take a firm hold of it. As soon however as the hollow arm is raised the arm 98 of the pawl lever 97 moves away from the lug 99 and in so doing allows the arm 98 to drop into a perpendicular position which in turn makes the pawl engage with the ratchet teeth of the ratchet 96. This holds the rod 95 in position in which the cup 94 has allowed it to drop so that the apple is held between the fingers and with a firm support formed by the cup 94 at the back thereof. The upper end of the hollow arm 60 is mounted to slide in the yoke 100 which yoke is pivoted in suitable bearings provided in the uprights 53 and 54.

Keyed to the shaft 9 on the end thereof opposite to the end on which the sprocket gear 10 is mounted is the crank 101. This crank is connected with the crank 102 carried on the shaft 55 by means of the connecting rod 103. On the rotation of the shaft 9 through the sprocket wheel 7 the crank 101 is rotated and its movement is communicated to the crank 102. One complete revolution of the crank 101 moves the crank 102 from the position shown in Fig. 5 to the position shown in Fig. 6 and back again to the position shown in Fig. 5. The rocking motion thus given to the shaft 55 to which the crank 102 is keyed moves the arms 56 and 57 from the position shown in Fig. 5 to the position shown in Fig. 6. In the position shown in Fig. 5 the arms 56 and 57 hold the arm 60 and the fingers carried on the lower end thereof so that an apple placed in the position indicated at 51^A in Fig. 6 is gripped thereby as described above. The arm 60 with the apple firmly held in place between its fingers is then raised into the position shown in Fig. 6. Just before the arm has reached this position the fork of the paring machine (not shown) projects into the path thereof and by the time the arm has reached its final upward position the apple carried by the arm is forced with its free end into the fork of the paring machine.

When in this position a lug 103^A carried on the sprocket wheel 7 makes engagement with the outer end of the small lever 89. A further rotation of this sprocket wheel 7 shifts this finger and in doing so rocks the shaft 85 through the link 88. The finger 84 occupies at this point of the operation of the machine the position shown in Fig. 6 in which position it rests against the antifriction roller 81 carried on the lever 79. When the shaft 85 is rocked by the crank 86 through the finger 89 the finger 84 is given a short movement toward the right which forces the lever 79 downwardly and in doing so lifts the link 78 connected to it at the other end thereof. The upward movement of the link 78 in turn rocks the lever 76 to the left so that the link 77 moves the sleeve 71 toward the end of the arm 60 carrying the fingers. This movement of the sleeve is communicated to the plates 68 and 67 by reason of its contact with the plate 68 on the outward movement of these plates the eye-bolts 66 move the fingers 63 to their released position so that the apple forced onto the fork of the paring machine is released from the arm and is no longer held in place between them. The outward movement of the sleeve 71 is assisted by the expansion of the spring 93 which helps to release the finger the instant after the apple is placed on the paring machine.

To assist the movement of the arm from its vertical to its horizontal position a coil spring 104 is wound around the shaft 55 and one end thereof is held in contact with one of the arms 56 or 57 so that when the shaft is rocked to move the arm 60 form the vertical to the horizontal position this spring will assist in moving the arms and at the same time take up any shock or jar that may be caused on the return movement of the arm due to the weight thereof.

We claim—

1. A machine for handling fruit comprising a vertical elevating mechanism, a track, a feeding mechanism mounted to travel over said track, and a vertical pick up mechanism, said horizontal feeding mechanism being adapted to right the fruit during its travel over said track feeding mechanism and place the fruit into a predetermined position with relation to said pick up mechanism.

2. A machine for handling fruit comprising a horizontal feeding mechanism, said horizontal feeding mechanism comprising a horizontal conveyer wheel, cups mounted on the periphery of said conveyer wheel and means to move said cups from a radial to a tangential position on said wheel to intermittently feed fruit by means of said mechanism.

3. In a machine for handling fruit the combination of a hopper having an opening in the bottom of said hopper, a conveyer mounted in a vertical plane on one side of said hopper, brackets carried on said conveyer, said brackets having a back with a vertical and horizontal slot cut into said back, pins projecting into the opening in the bottom of said hopper to prevent the fruit from falling out therefrom, said pins also being adapted to extend into the slots in the back of said brackets on their passage into said hopper through the opening in the bottom therein.

4. In a machine for handling fruit the combination of a hopper having an opening in the bottom of said hopper, a conveyer mounted in a vertical plane on one side of said hopper, brackets carried on said conveyer, said brackets having a back with a vertical and horizontal slot cut out into said back, pins projecting into the opening in the bottom of said hopper to prevent the fruit from falling out therefrom, said pins also being adapted to extend into the slots in the back of said brackets on their passage into said hopper through the opening in the bottom therein, a deflecting finger on one side of said conveyer near the top thereof, said deflecting finger being adapted to project into the horizontal slot of said brackets to brush the fruit out of said brackets at the point where said brackets pass said deflecting finger.

5. In a machine for handling fruit the combination of a hopper, a conveyer mounted to elevate the fruit from said hopper, a table, said conveyer being adapted to drop the fruit picked up from said hopper onto a track provided on said table, a feeding mechanism comprising an endless series of cups mounted to travel over said track, said cups being automatically and intermittently moved to project over said track and withdrawn therefrom, during their travel over said table, a pick up mechanism comprising an oscillating arm having a series of gripping fingers at the bottom thereof, means to close said fingers around the fruit properly located by said feeding mechanism, means to oscillate said arm from a vertical to a horizontal position and means to release said fingers around the fruit and place it onto a paring machine.

6. In a machine for handling fruit the combination of a pick up mechanism said pick up mechanism comprising a pair of uprights a trunnion bearing mounted to rock between said uprights, a hollow arm mounted to slide in said trunnion bearing, said arm carrying gripping fingers on one end thereof, means to automatically close or release said fingers at a predetermined position of said arm, a backing plate mounted between said gripping fingers, means to automatically adjust said backing plate with relation to the heights of the fruit picked up by said fingers and means to swing said arm from a vertical to horizontal position.

7. In a machine for handling fruit the combination of a picking mechanism comprising a pair of uprights, a trunnion bearing mounted to rock between said uprights near the top thereof, a hollow arm mounted to slide in said trunnion bearing, said hollow arm having a series of gripping fingers pivotally mounted at one end thereof, means to automatically spring said fingers toward or away, from the central axis of said hollow arm, a gaging rod mounted to slide in said hollow arm, a cup mounted on the end of said gaging rod and between gripping fingers, a ratchet in the other end of said gaging rod, a pawl mounted on said uprights, said pawl being adapted to engage with said ratchet and hold said cup on the end of said rod according to the size of the fruit that is placed between said gripping fingers to form a firm back for the fruit.

8. In a machine for handling fruit the combination of a pick up mechanism, said pick up mechanism comprising a frame, a pair of uprights mounted on said frame, a trunnion bearing mounted between said uprights, a hollow arm mounted to slide in said trunnion bearing, gripping fingers mounted on the end of said hollow arm, links connected to said fingers and means to automatically move said links to rock said fingers, a rod mounted to slide in said hollow arm, a plate carried on the lower end of said rod between said fingers, a ratchet on the upper end of said rod, a pawl mounted on said frame, a cam formed on said pawl, said pawl being adapted to engage said ratchet when said arm is lifted from a vertical to a horizontal position to hold said plate carried on the end of said rod rigidly in place between said fingers, said cam on said pawl being adapted to disengage said pawl from said ratchet when said arm is in a vertical position to allow said plate to adjust itself to the size of the apple gripped by said fingers.

9. In a machine for handling fruit, the combination of a feeding and locating mechanism comprising a track, an endless conveyer traveling over said track, said conveyer having cups mounted to swing thereon, stationary cams provided alongside of said conveyer, means carried on said cups for engaging with said cams, said cams being adapted to move said cups alternately to project over and withdraw from over said track, means for picking up the fruit fed and located by said feeding and locating mechanism.

In testimony whereof we affix our signatures.

JAMES HENRY TOMPKINS.
CARROLL J. FOSTER.